United States Patent
Inoue et al.

[15] 3,703,796
[45] Nov. 28, 1972

[54] AUTOMATIC PACKING AND WRAPPING APPARATUS

[72] Inventors: Kiyoshi Inoue; Tetsuo Ishikawa; Shingo Okada, all of Iwaki, Japan

[73] Assignee: Kureha Kagaku Kogyo Kabushiki Kaisha, Tokyo-to, Japan

[22] Filed: Feb. 12, 1971

[21] Appl. No.: 114,850

[30] Foreign Application Priority Data

Feb. 12, 1970  Japan .....................45/11460

[52] U.S. Cl. ..................................53/180, 53/138 R
[51] Int. Cl. ..........................B65b 9/12, B65b 51/04
[58] Field of Search ...........53/28, 180, 122, 138 R; 99/109

[56] References Cited

UNITED STATES PATENTS

| | | |
|---|---|---|
| 2,685,769 | 8/1959 | Conti ..........................53/122 |
| 2,691,257 | 10/1954 | Vogt ..........................53/180 X |

FOREIGN PATENTS OR APPLICATIONS 621,079  5/1961  Canada .......................53/122

Primary Examiner—Robert C. Riordon
Assistant Examiner—Eugene F. Desmond
Attorney—Sughrue, Rothwell, Mion, Zinn & Macpeak

[57] ABSTRACT

An automatic packing and wrapping apparatus for wrapping articles such as blocks of meat, comprising an assembly for forming a strip of synthetic resin film into a tubular shape, an assembly for feeding the article into the tubular film through nozzles, and an assembly for tying the ends of the film so as to seal the article in the film. The nozzles include a crushing mechanism comprising, for example, a rotary cutter and a fixed cutter each secured to the end of a respective nozzle. The article is crushed by the crushing mechanism at predetermined intervals to form alternate bulky and slender portions for every given length of the article in the film. The article portions within the film are pinched and squeezed by a pair of pinch rollers, and then the surrounding film is tied with metal clips or the like.

5 Claims, 7 Drawing Figures

PATENTED NOV 28 1972 3,703,796
SHEET 1 OF 2
FIG.1
FIG.2
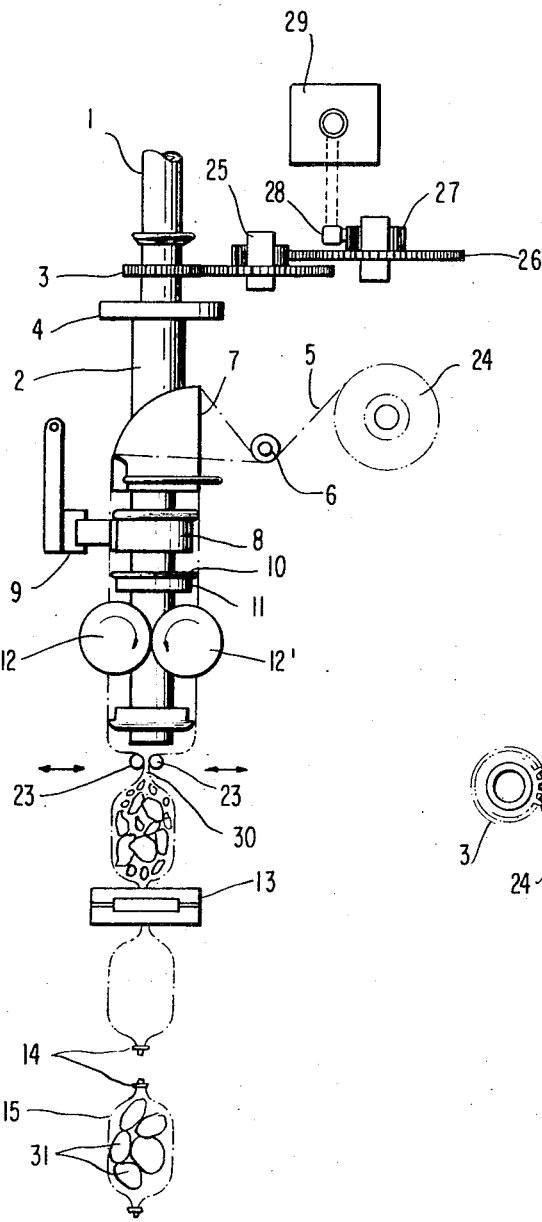
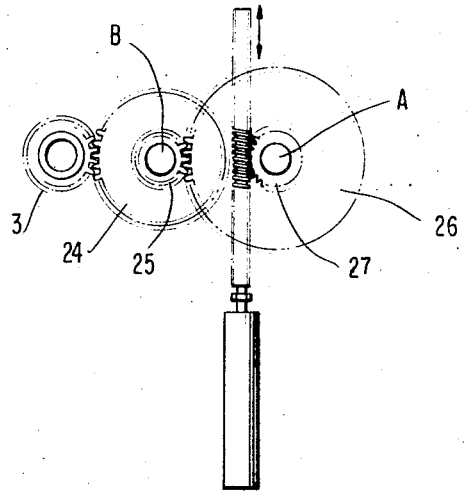
INVENTOR
KIYOSHI INOUE
TETSUO ISHIKAWA
SHINGO OKADA
BY Sughrue, Rothwell, Mion, Zinn & Macpeak
ATTORNEYS

AUTOMATIC PACKING AND WRAPPING APPARATUS

BACKGROUND OF THE INVENTION

This invention relates to an automatic packing and wrapping apparatus which effects the steps of forming a strip of synthetic resin film into a tubular form, inserting a nozzle into the tubular film, introducing through the nozzle an article to be packed, removing the article in the cylindrical film at predetermined intervals, and tying those portions of the film with which the article has been removed, with metal clips thereby to seal the article in the film.

When an article containing large lumpy fragments such as blocks of meat is packed and wrapped by a conventional automatic packing and wrapping machine of this type, fragments of meat or fibrous tissues of meat remain at those portions of the cylindrical film from which the contents have been removed by outside means such as pinch rollers before the tying operation, and cause the contents to bite the film at the time of tying and thus break the film. There is also the disadvantage that the wrapped article will be putrefied because of the meat fragments remaining in those portions of the tubular film which have been gripped with pinch rollers. In an attempt to overcome such disadvantages, we have developed an automatic packing and wrapping machine wherein a cutter to be driven from outside is provided at the end of a nozzle which feeds an article to be wrapped into a tubular film, so as to cut off blocks of the article at the end of the nozzle. At the same time, the article is intermittently fed into the tubular film. In this machine, it is necessary to control the timing of the cutting and squeezing, and to squeeze dexterously the interface between the air and the upper surface of meat discharged intermittently from the nozzle and cut off. If a part even slightly above the interface is squeezed or gripped, air remains in the resulting package, and if a part even slightly below the interface is squeezed, the meat bites the film. The control of the timing, however, becomes increasingly difficult with an increase in the folded width of tubular film and the size of meat blocks, which in turn tends to lead to inadequate packages wherein the film is cut by the meat or air is trapped therein.

SUMMARY OF THE INVENTION

An object of the present invention is to remove the aforementioned defects of our previously developed apparatus by providing an automatic packing and wrapping apparatus wherein a crushing mechanism is provided in a nozzle for feeding an article to be packed, so as to crush blocks of the article, for example blocks of ham, intermittently and to form slender portions at predetermined intervals of the article in a tubular film as a result of complete crushing. These portions then are squeezed with pinch rollers completely and then tied and sealed with metal fasteners or the like.

According to the apparatus of the present invention, a rotary blade is externally driven and is rotated continuously for a first period of time, and subsequently for a second predetermined period of time, the article then being discharged from the nozzle remaining stationary while the discharge port is being opened. By this operation, the article contained in the cylindrical film is crushed at predetermined intervals to form sausage-like slender portions which can be easily gripped and squeezed with pinch rollers. This ensures precise tying without causing entrapped air or biting of the film. In our previous apparatus, a cutting blade had to be provided at the end of the nozzle in order to effect precise timing control. However, in the apparatus of the present application, the crushing mechanism need not be provided at the end of the nozzle, but may be provided at the other end on the side of article feeding or at a point between the two ends of the nozzle.

BRIEF DESCRIPTION OF THE DRAWINGS

The apparatus of the invention will be more specifically described below with reference to the accompanying drawings in which:

FIG. 1 is a side elevational view of the automatic packing and wrapping apparatus of this invention;

FIG. 2 is a plan view of the drive portion of the apparatus of FIG. 1;

DESCRIPTION OF THE PREFERRED EMBODIMENTS

Figure 3:
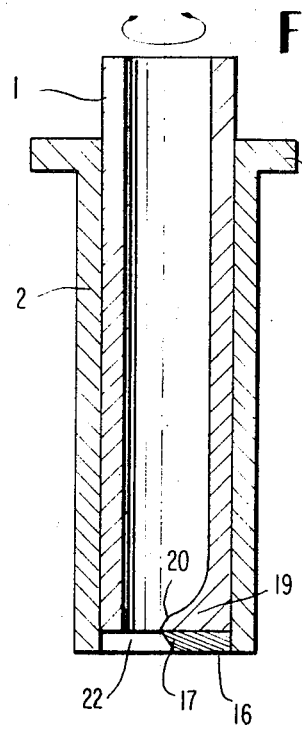
FIG. 3 is a vertical sectional view of the nozzle in an open condition.

Referring to FIGS. 1 and 2, an inside nozzle 1 is rotatably fitted in an outside nozzle 2. The inside nozzle 1, to which a gear 3 is secured, is intermittently rotated a predetermined number of times for a predetermined period of time through gears 27, 26, 25 and 24. The gear 27 meshes with a rack 28, and for every packing, an air piston 29 causes the rack 28 to make a reciprocal movement over a predetermined distance alternately in the direction of arrows shown in FIG. 2.

Figure 4:
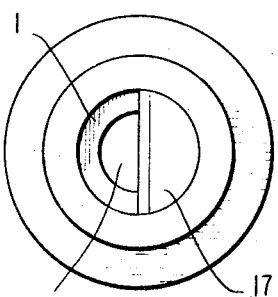
FIG. 4 is a bottom plan view of the nozzle shown in FIG. 3.

The outside nozzle 2 is fixed to a stand (not shown) by a flange 4, and its bottom portion is partially closed, as shown in FIGS. 3 and 4, by a semi-circular bottom plate 16 whose edge constitutes a cutter 17.

Similarly, the bottom portion of the inside nozzle 1 is partially closed by a semi-circular bottom plate 19 whose edge constitutes a cutter 20. A discharge port 22 is constructed such that it is always open at the time when the inside nozzle 1 remains stationary before and after its rotating motion. A strip of packaging synthetic resin film 5 is fed through a film guide roller 6, and guided in a cylindrical form by means of a forming plate 7. The overlapping part of the film is welded, for example, by the action of a high frequency negative electrode 8 and a high frequency positive electrode 9, and is thus formed into a tubular film 10. The film 10 is passed through a sizing ring 11, and on one or both sides of the outside nozzle 2, a part of the tubular film 10 is held, according to the state of the article contained in the film, by a pair (or two pairs) of feed rolls 12, 12' which rotate in the direction of arrows and deliver the film downwardly. The film containing the article is then passed through a pair of squeeze or pinch rollers 23, 23', and the slender end portions 30 of the film between which the article contained has been squeezed are tied with metal fasteners 14 by a tying machine 13. The final package obtained is shown at 15, and the blocks of the article or articles contained in it, at 31.

As previously stated, the strip of film 5 passes the guide roller 6, and is formed into a tubular shape by the forming plate 7. The overlapping portion of the film is welded while passing between the positive and negative electrodes 9 and 8, and is pulled downwards by the feed rollers 12, 12'. The article to be packed is fed through the inside nozzle 1, and fed into the tubular film. By the action of the cutter 20 provided at the end of the inside nozzle 1 which rotates at predetermined intervals for predetermined time periods according to the length of the package desired, and of the fixed cutter 17 secured to the end of the outside nozzle 2, the article is discharged from the nozzles in a state having alternate bulky and slender portions for every given length.

Figure 5:
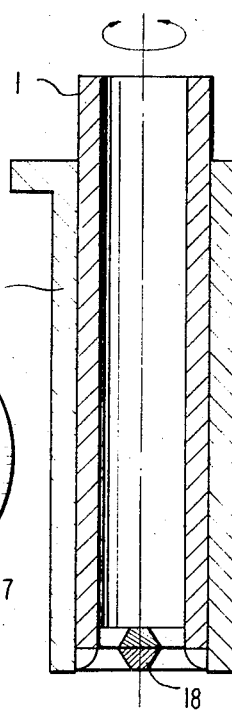
FIG. 5 is a vertical sectional view of another embodiment of a nozzle usable in the present invention.
Figure 6:
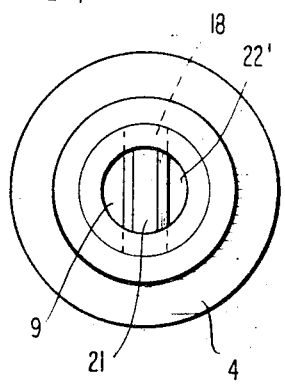
FIG. 6 is a bottom plan of the nozzle shown in FIG. 5.

As shown in FIG. 3, the crushing mechanism comprises a combination of the rotary cutter 20 and the fixed cutter 17 provided at the end portions of the nozzles 1 and 2, respectively. The structure and operation of the crushing mechanism, however, are not limited to the embodiment shown in FIG. 3, and any suitable crushing mechanism could be utilized. Another embodiment of the crushing mechanism is shown in FIG. 5 in which a rotary cutter 21 and a fixed cutter 18 are of a narrow, elongated configuration and have blades on both sides. Furthermore, each cutter may have two or more blades superimposed one on top of the other, or have a comb-like blade in the vertical direction. Other structures are also possible. When the article to be packed contains a tough ligament such as animal flesh, the crushing mechanism should desirably have two or more blades to cause them to work like scissors so as to cut off the tough fibrous tissues. On the other hand, when the article is relatively easy to cut (e.g. artificial meat), the crushing mechanism may have only one blade, or may be of any other type not containing blades, such as the impact or milling type. The rotary part of the crushing mechanism can be driven by utilizing the inside nozzle and/or the outside nozzle, but if desired, it may be driven by a shaft provided separately from the nozzles.

Figure 7:
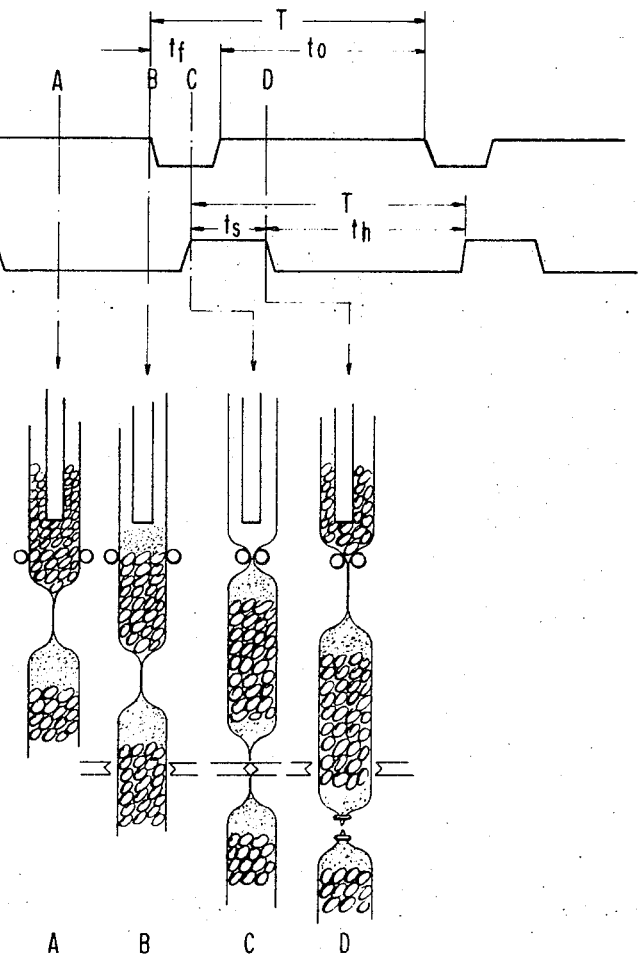
FIG. 7 is a schematic view illustrating the relation of the timing between the pinch rollers and the discharge port during the operation of the apparatus.

One example of operation will be described with reference to FIG. 7 in which:

*tf* shows the time during which the inside nozzle rotates and crushes the article to be packed,

*to* shows the time during which the inside nozzle remains stationary with its end opened;

*ts* shows the time during which the pinch rollers grip and squeeze the article contained in the film, and

*th* shows the time during which the pinch rollers are apart from each other.

Hence, T is the time of one cycle needed for one packing operation.

At point A, the discharge port is open, and the inside nozzle 1 is stationary, while the pinch or squeeze rollers are apart from each other. Thus, blocks of meat come out from the discharge port, and the upper surface of the meat block is falling downwards with the stream of meat. The inside nozzle 1 begins to rotate and crush the meat block at point B. At point C, the nozzle is rotating and crushing the meat, and the pinch rollers begin to squeeze that portion of the crushed meat which has been discharged to the underside of the stuffer. Downwards, packing and cutting begin. At point D, the pinch rollers have completed the squeezing, and the discharge port is open. The inside nozzle is stationary. Blocks of meat continue to come out from the discharge port, but until the pinch rollers depart from each other, the upper surface of the meat blocks is rising. When the pinch rollers depart from each other past the point D, the upper surface of the meat blocks continues to come down.

In the manner mentioned above, the article to be packed is poured into a tubular film in a state of being crushed at predetermined intervals. Squeezing the crushed portions can therefore be performed very easily and precisely, and this obviates such disadvantages as the air remainder, biting or film break. The article can be completely sealed into the package to enable it to be stored for long periods of time.

We claim:

1. In an automatic packing and wrapping apparatus, comprising means for forming a strip of synthetic resin film into a tubular shape, means for feeding an article to be wrapped into said tubular film through nozzle means, and means for tying the film so as to seal the article in the film; the improvement comprising:

a crushing mechanism in said nozzle means for crushing the article at predetermined intervals to form alternate bulky and slender portions for every given length of the article in the film, said nozzle means comprising a first nozzle rotatably connected to a second nozzle and said crushing mechanism comprising a first cutter secured to said first nozzle and a second cutter secured to said second nozzle, means for pinching and squeezing the slender portions in the film, and means for closing the ends of the film to seal the article portions therein.

2. An automatic packing and wrapping apparatus according to claim 1 wherein said first nozzle is rotatably mounted within said second nozzle.

3. An automatic packing and wrapping apparatus according to claim 1 wherein each of said first and second cutters includes two or more blades.

4. An automatic packing and wrapping apparatus according to claim 1 wherein said crushing mechanism comprises an elongated strip-like rotary cutter and an elongated strip-like fixed cutter each having blades on both sides thereof.

5. An automatic packing and wrapping apparatus according to claim 2, wherein said crushing mechanism comprises an elongated strip-like rotary cutter and elongated strip-like fixed cutter, each having blades on both sides thereof.

* * * * *